(12) United States Patent
Espindola et al.

(10) Patent No.: US 6,301,425 B1
(45) Date of Patent: Oct. 9, 2001

(54) MAGNETICALLY TUNABLE OPTICAL ATTENUATOR AND METHOD OF ATTENUATING SIGNALS

(75) Inventors: Rolando Patricio Espindola, Chatham; Randy Clinton Giles, Whippany; Sungho Jin, Millington; Hareesh Mavoori, Berkeley Heights, all of NJ (US)

(73) Assignee: Agere Systems Optoelectronics Guardian Corp., Orlando, FL (US)

( * ) Notice: Subject to any disclaimer, the term of this patent is extended or adjusted under 35 U.S.C. 154(b) by 0 days.

(21) Appl. No.: 09/255,299

(22) Filed: Feb. 22, 1999

(51) Int. Cl.[7] .................................................. G02B 6/00
(52) U.S. Cl. .......................................... 385/140; 359/283
(58) Field of Search .................................... 385/137, 124, 385/140, 51, 25, 33; 359/246, 281, 280, 283, 324, 231

(56) References Cited

U.S. PATENT DOCUMENTS

| | | | |
|---|---|---|---|
| 5,521,741 | * | 5/1996 | Umezawa et al. .................... 359/246 |
| 5,589,933 | * | 12/1996 | Osgood et al. ...................... 359/231 |
| 5,812,304 | * | 9/1998 | Shirasaki et al. .................... 359/281 |
| 6,018,412 | * | 1/2000 | Fukushima .......................... 359/283 |
| 6,085,016 | * | 7/2000 | Espindola et al. ................... 385/140 |

* cited by examiner

*Primary Examiner*—Frank G. Font
*Assistant Examiner*—Sang H. Nguyen
(74) *Attorney, Agent, or Firm*—Lowenstein Sandler PC

(57) ABSTRACT

A variable attenuator device is disclosed that may be magnetically and latchably controlled such that it does not require a continuous power supply to maintain a particular loss level. The variable attenuator comprises two optical components disposed in spaced apart relation to define a gap between them and a magnetic shutter positioned within the gap. The shutter is movable, due to its magnetic properties, from a first position to at least a second position, where the second position may be within, partially within, or outside of the gap. A mechanism is provided for magnetizing or actuating the shutter to cause it to move from the first position to the at least second position. When the shutter is in the first position, it causes a certain amount of attenuation in the signal being transmitted between the two optical components, and when it moves to the at least second position, a different amount of attenuation is caused, such that movement of the shutter causes a variation in the attenuation. With this attenuator, the variation in attenuation may be achieved via coupling loss while the optical components (e.g., mating fibers), are maintained in a fixed position, thereby avoiding difficulties associated with fiber movement.

21 Claims, 4 Drawing Sheets

MAGNETICALLY TUNABLE OPTICAL ATTENUATOR AND METHOD OF ATTENUATING SIGNALS

CROSS REFERENCES TO RELATED APPLICATIONS

This application is a continuation-in-part of U.S. application Ser. No. 09/097,549 filed by R. Espindola, et al. on Jun. 15, 1998 and entitled, "Magnetically Controlled Variable Optical Attenuator" (now U.S. Pat. No. 6,085,016 issued Jul. 4, 2000).

FIELD OF THE INVENTION

The present invention relates to an optical attenuator and, more particularly, to a variable attenuator that is magnetically adjustable and optionally may be latchably controlled and to communications systems comprising the attenuators.

BACKGROUND OF THE INVENTION

Optical fibers are well known in the art and useful for many applications in modern communications systems. A typical fiber optic communications system comprises a source of optical signals, a length of optical fiber coupled to the source for transmitting the signals, and a receiver coupled to the fiber for receiving the signals. Basically, the optical fiber comprises an inner core fabricated from a material having a certain index of refraction, and a cladding surrounding the core. The cladding is comprised of a material having a lower index of refraction than the core. As long as the refractive index of the core exceeds that of the cladding, a light beam propagated along the core exhibits total internal reflection, and it is guided along the length of the core. One or more amplifying systems may be disposed along the fiber for amplifying the transmitted signal.

Filters and attenuators are useful in these systems to change the power levels of various signals. In modern communications systems, variable attenuators are becoming increasingly more important, especially in dense wavelength-division multiplexed (DWDM) systems. Variable attenuators are used to vary the amount of loss that light will experience as it passes through the system, ranging from low loss (<1 dB), to very high loss (>30 dB). The mechanism by which the attenuators induce loss in the signals may be attributable to coupling loss between fibers, polarization loss, absorption loss, scattering loss, or any combinations of these.

Variable attenuators typically have comprised complicated structures with moving parts that rotate or otherwise move the position of the fibers or of a separate attenuator device, requiring a continuous application of power to maintain a particular loss level. For example, U.S. Pat. No. 5,745,634 to Garrett, et al., "Voltage Controled Atenuator," issued Apr. 28, 1998, shows a variable attenuator with which the variation in attenuation is obtained by actuating a DC motor which displaces the position of the attenuator. U.S. Pat. No. 5,677,977 to Smith, "Optical Attenuator," issued Oct. 14, 1997, shows a variable attenuator with which the variation in attenuation is obtained by providing a circular loop of optical fiber which is rotated with use of a lockable rotating shaft clamped to the side of the loop. U.S. Pat. No. 5,781,341 to Lee, "Mororized Tunable Filter and Motorized Variable Attenuator," issued Jul. 14, 1998, shows a variable attenuator with use of a cam attached to a collimator; the cam rotates the collimator to adjust the loss.

A variable attenuator based on coupling loss is typically composed of two separate fibers whose separation is controlled with mechanical motion. As the amount of the separation between the fibers increases, the amount of loss also increases. See, for example, Brenner et al., "Low-Reflectivity In-Line Variable Attenuator Utilizing Optical Fiber Tpers," J. LIGHTWAVE TECH., Vol. 18 (1990), at p. 7, and U.S. application Ser. No. 09/097,549, "Magnetically Controlled Variable Optical Attenuators," filed by Espindola et al. on Jun. 15, 1998, and assigned to the present assignee, which is incorporated herein by reference. See also U.S. Pat. No. 5,319,733 to Emmons et al., "Variable Fiber Optical Attenuator," issued Jun. 7, 1994, which shows a variable attenuator using two terminated fibers that are placed in holders with their terminal ends aligned; the holders are rotated relative to each other while the alignment is maintained to provide variable attenuation. Variable attenuators based on polarization loss are typically composed of GRIN lenses to collimate light from the fiber, a plate or cell to rotate the polarization of light; and a polarizer to induce loss. See, e.g., U.S. Pat. No. 5,727,109, to Pan et al., "Optical Attenuator with Low Polarization Mode Dispersion," issued Mar. 10, 1998, and assigned to E-tek Dynamics, Inc.

As can be seen, variable attenuators typically have involved use of moving parts, with the waveguide itself being moved, and often they have required application of a continuous power supply to maintain a particular loss level. As may be appreciated, those concerned with the development of optical communications systems continually search for new components and designs including new attenuator designs. As optical communications systems become more advanced, there is growing interest in increasing the number of wavelengths that may be transmitted by the systems and in new methods and devices for modulating, filtering, and switching wavelength channels. The instant invention provides a variable attenuator device that may be used to achieve a predetermined amount of loss without a continuous supply of power to maintain a particular loss level and a higher speed of attenuation as compared with previous devices. Further advantages may appear more fully upon considering the description given below.

SUMMARY OF THE INVENTION

Summarily described, the invention embraces a variable attenuator comprising two optical components disposed in spaced-apart relation to define a gap between them. A magnetic shutter is positioned within the gap and movable from a first position to at least a second position, where the second position may be within, partially within, or outside of the gap. A mechanism is also provided for magnetizing or actuating the shutter to cause it to move from the first position to the at least second position, optionally with a latchable change in position (and thereby attenuation) so that a continuous power supply is not needed. This device may comprise a second, stable magnetic component. When the shutter is in the first position, it causes a certain amount of attenuation in the signal being transmitted between the two optical components, and when it moves to the at least second position, a different amount of attenuation is caused, such that moving the shutter causes a variation in the attenuation.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention and are not to scale. The same reference numerals are used throughout the figures to designate corresponding elements.

DETAILED DESCRIPTION OF THE INVENTION

With this invention, a variable attenuator is provided which utilizes two axially aligned but separated optical components (e.g., two mating optical fibers), with the separation of the components defining a gap between them. A magnetic shutter projects into or is placed within the gap and is movable from a first position to at least a second position to control the amount of coupling loss between the components. Movement in the shutter may be induced by variably magnetizing the shutter or a magnetic component placed adjacent the magnetic shutter. The optical components may remain in a fixed position, thus reducing complications associated with fiber movement control. With this invention, a predetermined amount of loss can be latchably set by magnetizing to a particular level the shutter, an adjacent magnetic component, or both, thereby altering the shutter position, without having to apply additional power thereafter to maintain the desired degree of attenuation.

Figure 1A:
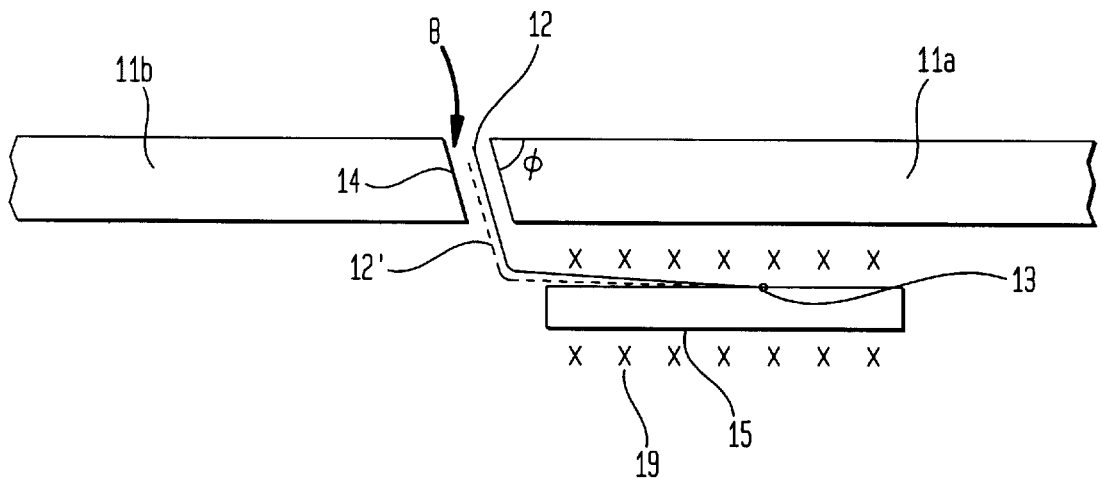
FIGS. 1A–1B schematically illustrate exemplary embodiments of the inventive attenuator with a magnetically movable shutter placed between two optical fibers.

More particularly with reference to the figures, FIG. 1A schematically illustrates an exemplary embodiment of the inventive attenuator with a magnetically movable and latchable shutter magnet 12 placed between two optical components 11a, 11b. The components 11a, 11b are in spaced-apart relation to define a gap 8 between them. The components 11a, 11b may comprise fibers, lasers, photo-diodes, or other optical components known in the field, though in FIG. 1A they are shown comprising two optical fibers. When optical fibers are used, preferably they are cleaved at an angle (e.g., angle φ), and the end surfaces (e.g., 14), are coated to provide an anti-reflective end surface. The end surfaces are aligned, and the fibers are set in a fixed, aligned position. The gap 8 between the fibers preferably should be very small to maximize the optical coupling between the two components. Preferably, the gap is less than about 20 mil, more preferably less than about 5 mil, and even more preferably less than 1 mil. The gap may be filled with refractive-index matched materials (e.g., gels, liquids, or other substances), to reduce optical losses.

A movable magnetic shutter magnet 12 is placed in the gap 8 between the components, and upon magnetic actuation, the shutter will move from a first position (12) to at least a second position (12'—reflected by the hatched line of FIG. 1A). The movement of the shutter may be within the gap, in and out of the gap, or partially within and partially out of the gap, or a combination of these positions. When the shutter is positioned within the gap, it will partially or fully block the light traveling from one component 11a to the other component 11b, thus altering the optical coupling efficiency and producing a certain amount of attenuation. When the shutter is moved to at least the second position, the amount of the attenuation will be changed.

As illustrated in FIG. 1A, the inventive attenuator device may comprise two magnetic components, with the magnetic component comprising the shutter being mobile. The inventive attenuator includes a device for actuating the magnetic shutter 12 and causing it to move, which in FIG. 1A is a second magnetic component 15 that is stationary. As shown in FIG. 1A, the second magnetic component 15 preferably has a larger dimension than the shutter and is elongated in shape (e.g., comprises a rod, bar, plate, or the like), and for certain applications (e.g., where latchability is desired), the magnet strength of the second component 15 is programmable and latchable. The magnetic shutter may be elastically confined to move within defined positions or range of positions with a spring force. In FIG. 1A, the spring force is obtained by the shutter being fabricated as an elongated thin strip of springy and preferably metallic magnetic material, with the strip being secured at one point adjacent one end to the second, stable magnetic component 15 with bond 13. The attachment (e.g., 13) may be formed with use of epoxy, solder, brazing, welding, glass adhesives, mechanical clamping, mechanical hooks, or other attachment methods or devices as are known.

At least one solenoid 19 with conductive wire windings may be disposed adjacent or preferably, around either one or both of the shutter and the second magnetic component so that a magnetic field can be generated when a current is passed into it. The solenoid may be a single solenoid, or it may be split into two or more segments, and if desired, independent controls may be used for enhancing control over the magnetic field generated. When the magnetic components (either both or only one of them), are subjected to an externally applied magnetic field, e.g., by the solenoid 19, their magnetizations are altered and hence, the magnetic attractive or repulsive force between them (12, 15), is altered. This change in the magnetic force will cause a change in the position of the shutter within the gap, thereby causing a variation in the light attenuation.

Figure 1B:
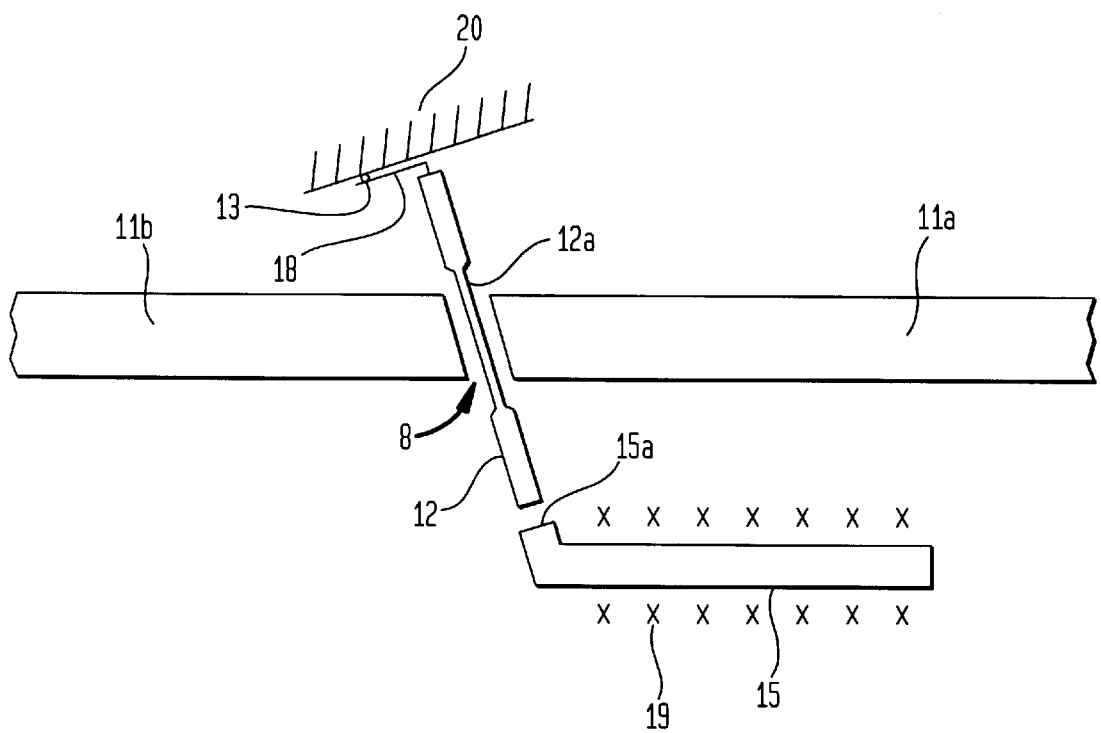

FIG. 1B illustrates another exemplary embodiment of the inventive attenuator comprising two optical fibers 11a, 11b, separated by a gap 8, and two magnetic components, with one magnetic component comprising the shutter magnet 12 and being mobile, and the second magnetic component 15 being stationary. As with FIG. 1A, a solenoid 19 is provided for application of a magnetic field. In contrast to the embodiment of FIG. 1A, the embodiment of FIG. 1B provides a separate spring 18 (e.g., for elastically confining movement of the shutter). The spring 18 is coupled at one end to the shutter magnet 12 and bonded at the other end (e.g., with bond 13) to a support frame 20. Alternative to the embodiments of FIGS. 1A or 1B, a separate spring may be disposed between the shutter magnet 12 and the second component 15 (e.g, in FIG. 1B, the support frame 20 may comprise a stationary magnet), providing a further approach for elastically confining the magnetic shutter magnet 12. Besides being bonded to the second magnetic component (as in FIG. 1A), or to a support frame (as in FIG. 1B), the shutter also could be attached onto a structural component around the fiber or on the fiber assembly itself (e.g., on a sleeve or ferrule-shaped structural part).

As can be seen, the solenoid 19 of FIG. 1B is disposed around only the stationary magnetic component 15, whereas in FIG. 1A, the solenoid is coiled around both the shutter magnet 12 and the second magnetic component 15. In the configuration of FIG. 1A, application of the magnetic field by the solenoid will magnetize both the shutter magnet 12 and the second magnetic component 15 with the same polarity, so that magnetic repulsion between the second magnetic component 15 and the part of the shutter magnet adjacent the component will cause the shutter to move upwardly (e.g., from position 12' to position 12), if the shutter magnet is also made of programmable magnet or is a permanent magnet with the same polarity as the stationary programmable magnet. On the other hand, if the shutter magnet 12 is made of a soft magnetic material or is made of a permanent magnet with an opposite polarity relative to the stationary programmable magnet, the movement of the shutter magnet will be downward due to the magnetic attraction instead of repulsion. In FIG. 1B, an end pole 15a of the second component 15 is placed in close proximity to the end of the shutter magnet 12, which allows for more intimate magnetic interactions. When the magnetic component 15 of FIG. 1B is subjected to an externally applied magnetic field by solenoid 19, a magnetic attractive or repulsive force will be generated between this component 15 and the shutter magnet 12, thereby changing the position of the shutter within the gap to vary the light attenuation.

The shutter magnet 12 can have a variety of configurations. A typical thickness of the shutter is in the range of 0.1 to 200 microns, preferably in the range of about 1 to 50 microns. The shutter magnet may be made in a variety of geometries and configurations varying across its length or width. For example, as shown in FIG. 1B, a central portion 12a of the shutter magnet 12 is made thinner than the end portions, e.g., the central portion 12a could be etched to have a thickness of about 0.5 microns, while the surrounding regions could have a thickness of about 50 microns. In this way, the thicker regions adjacent the ends of the shutter provide mechanical support and dimensional stability to the central portion 12a, while the thinness of the central portion 12a reduces the likelihood that the shutter would rub against an end face of an optical component (11a, 11b), while moving within or in and out of the gap 8. It is preferable to configure and position the shutter in relation to the gap so that this rubbing of the fiber end face is avoided.

Figure 2A:
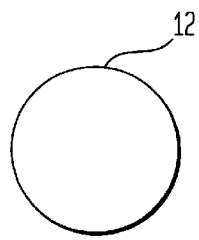
FIGS. 2A–2D reflect cross-sectional views of alternative exemplary configurations for the shutter.
Figure 2B:
Figure 2C:
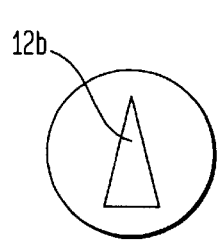
Figure 2D:
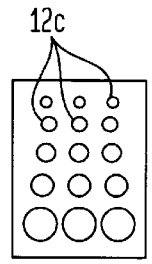

FIGS. 2A–2D reflect cross-sectional views of alternative configurations for the shutter device, which of course are exemplary and not limiting. As shown, the shutter can have a circular cross-section (FIG. 2A), a triangular cross-section (FIG. 2B), a circular cross-section with a triangular hole (12b) disposed therein (FIG. 2C), or a rectangular cross-section with a plurality of perforations (12c) disposed therein for providing a gradient (FIG. 2D). The shutter geometries including a gradient may provide a more gradual change in the amount of light passing between the optical components as the shutter is actuated to move relative to the gap as compared with when a solid shutter device is used. The shutter also could comprise a composite structure including a magnetic portion bonded onto another thin, non-magnetic strip (e.g., as shown in FIG. 5B, described below). The shutter alternatively could be made of a non-magnetic material that is attached to a portion of a movable, magnetic component which magnetically interacts with the second magnetic component 15 to move the shutter toward or away from the gap. Thus, it should be understood that the term "magnetic shutter" as used herein means a shutter device that is movable based on magnetic properties, the magnetic properties being the properties of the part that moves within or in and out of the gap or the magnetic properties of a piece that is attached to the part that moves within or in and out of the gap. In other words, the term "magnetic shutter" should be interpreted to encompass not only a shutter device that itself is made of magnetic material and is movable within the gap but also a device made of a nonmagnetic material that is attached to a movable, magnetic component which magnetically interacts with the second magnetic component 15.

The second magnetic component (also referred to as the "outside magnet" in that it generally is located outside the gap 8 between the optical components), can also take a variety of configurations, for example, it can be fabricated to have a rod, bar, plate, cylinder, or tube-shaped configuration. It preferably is magnetized along its length. The preferred dimension of the outside magnet will depend on the magnetic strength that is needed to magnetically attract or repel the shutter magnet 12 so as to achieve the desired attenuation; thus, the preferred dimensions of the outside magnet may depend on the relative size, shape, and magnetic properties of both the shutter magnet 12 and the outside magnet 15, their inter-magnet distance, and other parameters. However, a typical dimension of the outside magnet can be in the range of about 0.05 to 10 mm in width or diameter and about 5 to 100 mm in length.

The preferred materials for fabricating the shutter magnet 12 or second magnetic component 15 will be application dependent. For applications requiring non-latchable or continuous attenuation of the light signal, both magnetic components (e.g., the shutter magnet 12 and second component 15), may be comprised of soft magnetic materials with a low coercive force in the operation direction of less than 5 Oe. Also, in an alternative mode of operation, the attentuation can be momentary or high frequency in nature such that latchability of the attenuation is not needed. In these cases, both the shutter magnet 12 and the second magnetic component 15 may be made of soft magnetic materials. Exemplary soft magnetic materials include Ni—Fe alloys (permalloys), such as 80Ni—20Fe (wt %), 79Ni—17Fe—4Mo, 45Ni—55Fe, Fe—3%Si, and soft ferrites such as Ni—Zn ferrite or Mn—Zn ferrite. These soft magnetic materials typically have low coercivity ($H_c$) of less than about 10 Oe, and high magnetic permeability of greater than 1000. For very high frequency operations (e.g., continuous, fast or frequent attenuation at 10 MHz or higher), magnetically soft materials with minimal eddy current loss and ferromagnetic resonance are desired. Either electrical insulating magnetic materials such as ferrites or high resistance materials such as amorphous or nanocrystalline magnetic materials may be used. For even higher frequency operations, the magnetic materials preferably are in a film form (and may be multi-layer laminated if needed for higher flux density). To overcome ferromagnetic resonance loss, soft magnetic films with high anisotropy fields are generally desired. See Jin, APPLIED PHYSICS LETTERS, Vol. 70 (1997), at p. 3161.

Figure 3A:
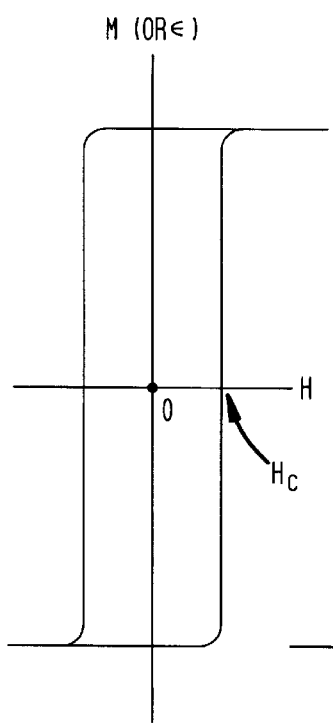
FIGS. 3A–3C illustrate the relationship between the applied magnetic field and latchable magnetization in a programmable magnet used in an inventive attenuator.
Figure 3B:
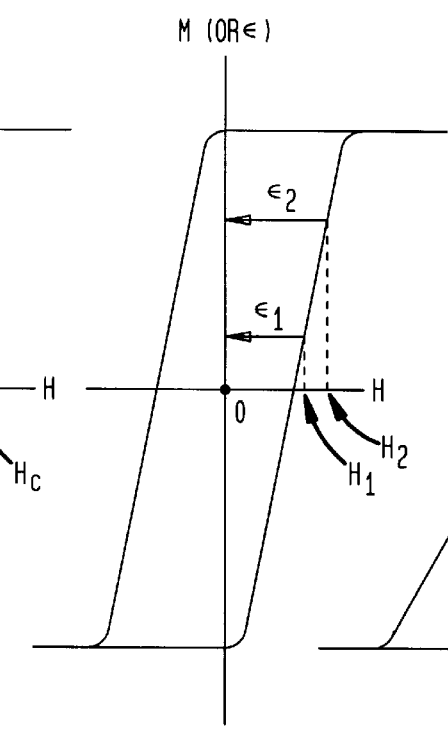

For applications involving less frequent attenuation, latchable magnetic components are desired for at least one of, or both of, the shutter magnet 12 and the second magnetic component 15. For latchable operation, at least one of the magnets (or both of them), exhibits a relatively square but controllably skewed magnetization-hysteresis loop ("M-H loop"), such as illustrated in FIGS. 3A–3B, and desirably has magnetic properties that are programmable and easily reconfigurable as the applied field is altered. In achieving latchability, it is not necessary that both of the magnetic components (e.g., the shutter magnet and the second magnetic component), be programmable, e.g., one may be made with a low-coercivity or high-coercivity magnetic material, while the other component is made with the programmable magnetic material.

Preferred magnetic materials for fabricating a latchable attenuator (e.g., used for either the shutter or outside magnet of the attenuator, or both) are those whose magnetic properties are modifiable by a pulse magnetic field. Some examples of suitable materials include Fe—Cr—Co, Fe—Al—Ni—Co (Alnico), Cu—Ni—Fe (Cunife), Co—Fe—V (Vicalloy), specially-processed, low-coercivity ($H_c$) rare-earth cobalt (Sm-Co) or Nd—Fe—B magnets, and Ba-ferrite or Sr-ferrite materials. A preferred range of coercivity for a programmable magnet is typically below about 500 Oe and more preferably below about 100 Oe for ease of programming by re-magnetization using a solenoid pulse field. The coercivity typically is above about 10 Oe and preferably above 30 Oe for maintaining the stability of the remanent magnetization and stability against demagnetization due to stray magnetic fields. Mechanically ductile and easily formable or machinable magnet alloys such as Fe—Cr—Co, Cu—Ni—Fe, or Co—Fe—V are particularly advantageous for they may be shaped into desired geometries, such as the desirably thin and optionally perforated or slitted geometries discussed above with reference to FIGS. 1B and 2B–2D. Stable permanent magnets with high coercive forces (e.g., where the coercivity is greater than about 1000 Oe), such as Sm—Co or Nd—Fe—B, are less preferred (unless modified to exhibit lower coercive forces) due to difficulties in reprogramming remanent magnetization using desirably low magnetic fields.

For satisfactory latching of shutter displacement after the field is removed, the programmable magnet (either the shutter magnet, the outside magnet, or both), should have a square magnetization-hysteresis loop ("M-H loop") with a squareness ratio (remanent magnetization to saturation magnetization) of at least about 0.85, preferably at least 0.90, even more preferably at least 0.95. With magnets exhibiting a square M-H loop (FIG. 3A), one may make a bi-stable gap device that switches between two attenuation levels, e.g., a base level corresponding to application of zero magnetic force (and a certain, corresponding attenuation level, e.g., allowing for ⅓ light passage or complete blocking), and a saturation level corresponding to application of a maximum magnetic force (and a corresponding attenuation level, e.g., allowing for ¾ light passage or complete light blocking). The zero magnetic force is achieved by applying an AC or DC demagnetizing field. The maximum (saturation) gap is achieved by a DC pulse current sufficient to saturate the magnets. An advantage of the bi-stable device is reduced sensitivity to applied current or stray magnetic fields.

Figure 3C:
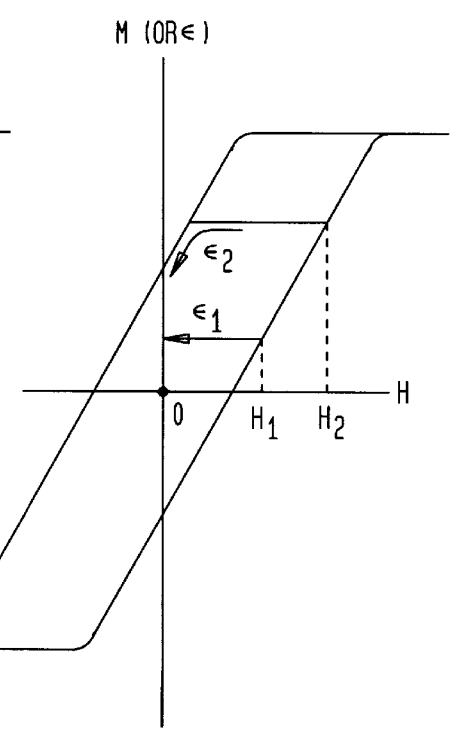

For ease of control, the M-H loop (or /ρ-H loop) is desirably skewed, as in FIG. 3B, by at least about 50% of $H_C$ up to about 150% of $H_c$, though excessive skewing, e.g., as shown in FIG. 3C, is not desirable. For continuous tuning of the attenuation at various levels, it is not always desirable that the shutter or second magnetic component exhibit a square M-H loop, as the steep side of the curve of FIG. 3A can be problematic when one seeks to achieve a certain intermediate shutter displacement (e.g., /ρ₁ or /₂). Intentional skewing of an M-H loop is described in U.S. patent application Ser. No. 09/020,206, filed Feb. 6, 1998 by Espindola et al., assigned to the present assignee and incorporated herein by reference. Intentional skewing of the M-H loop can be achieved by increasing the self-demagnetizing field of the magnet, e.g., by either increasing the effective cross-section of the magnet or reducing its length, thus decreasing the magnet length-to-diameter ratio. To illustrate, an example of intentional loop skewing involves using an Fe—28%Cr—7%Co alloy, deformation aged to yield a square M-H loop with $H_c$ of about 70 Oe. A dimension of 0.18" in diameter and 4" in length introduces a skewing of the M-H loop by about approximately 60 Oe, thus producing a M-H loop similar to that of FIG. 3B, which is preferred. With the optimal skewing of FIG. 3B, the remanent magnetization or remanent shutter displacement (after the applied field is removed), is still essentially the same as the saturation value (at least 90%), and the onset field of rapid decrease of M or /ρ when the field is reversed is near zero field and preferably in the range of about ±50% of the coercive force, and even more preferably in the range of about ±10% of the coercive force ($H_c$). The excessive skewing of FIG. 3C is not desirable as this may cause a deterioration of the latchability of the shutter displacement.

For an applied magnetic field of $H_1$ or $H_2$, the corresponding magnetization is latchably retained after the field is removed, and the corresponding shutter displacement in the gap, $\epsilon_1$ and $\epsilon_2$, is also latchably retained. With the latching, the device may be operated without a continuous supply of power. To vary the degree of optical attenuation, the extent of shutter displacement is altered and latched by changing the magnetization in the shutter magnet or the outside magnet or both. This can be achieved by either increasing the applied field or by demagnetizing and remagnetizing one or more of the magnets to a new field level. For magnetization of the magnets using a solenoid, a pulse field (a pulse current in the solenoid) can conveniently be used for high-speed, low-power operation of the device. A preferred duration or speed of the pulse field is in the range of about 10 to $10^{-6}$ seconds, more preferably about 1 to $10^{-4}$ seconds, and even more preferably about $10^{-2}$ to $10^{-4}$ seconds. The current pulse may have various shapes including sinusoidal, rectangular, trapezoidal, triangular, and irregular. The high-speed magnetic actuation that may be achieved with the inventive device desirably allows for high-speed attenuation of optical signals.

An important factor in assembly and operation of the inventive attenuator relates to axially aligning the optical fibers (11a, 11b), as the core size in a single-mode fiber typically is less than about 10 mm. To achieve an accurate alignment, a capillary or fiber-guiding tube may be used, which can be fabricated with a variety of materials, e.g., glass, quartz, metal or plastic. A window or slit may optionally be introduced in the tube for insertion of the shutter magnet.

Figure 4:
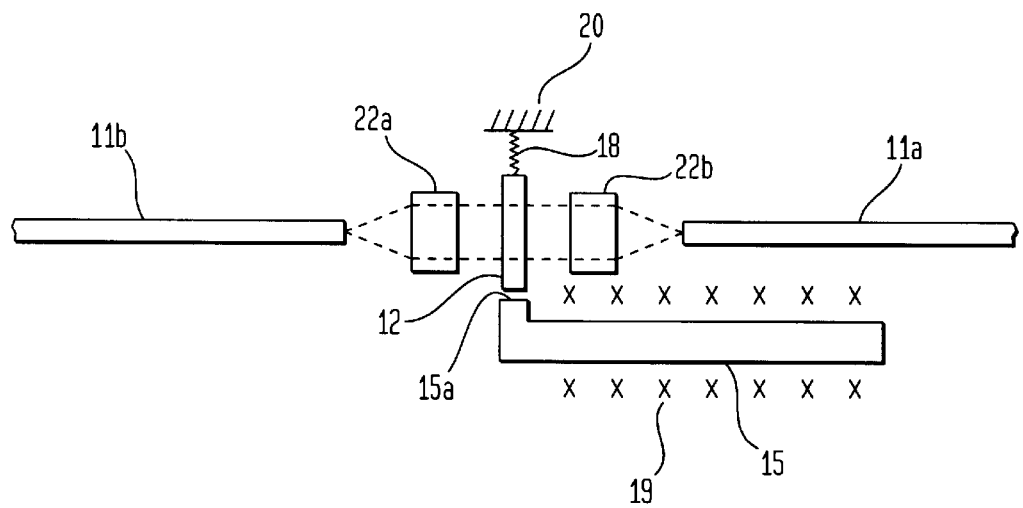
FIG. 4 schematically illustrates an alternative embodiment of the inventive attenuator.

To enhance alignment tolerances, the fibers may be fabricated having an increased taper (with a gradually increasing fiber diameter near the facing end surfaces), or separate light-broadening components optionally may be incorporated into the inventive devices, e.g., GRIN (graded refractive index) lenses or optical focusing lenses. FIG. 4 illustrates an alternative embodiment of the inventive attenuator using two light-broadening components 22a, 22b. Here, the shutter 12 is coupled with spring 18 to a fixed support 20, and the second magnetic component 15 is placed with an end pole 15a facing an end of the shutter 12. Two GRIN lenses 22a, 22b are placed within the gap 8, with the shutter magnet 12 placed between the lenses.

Figure 5A:
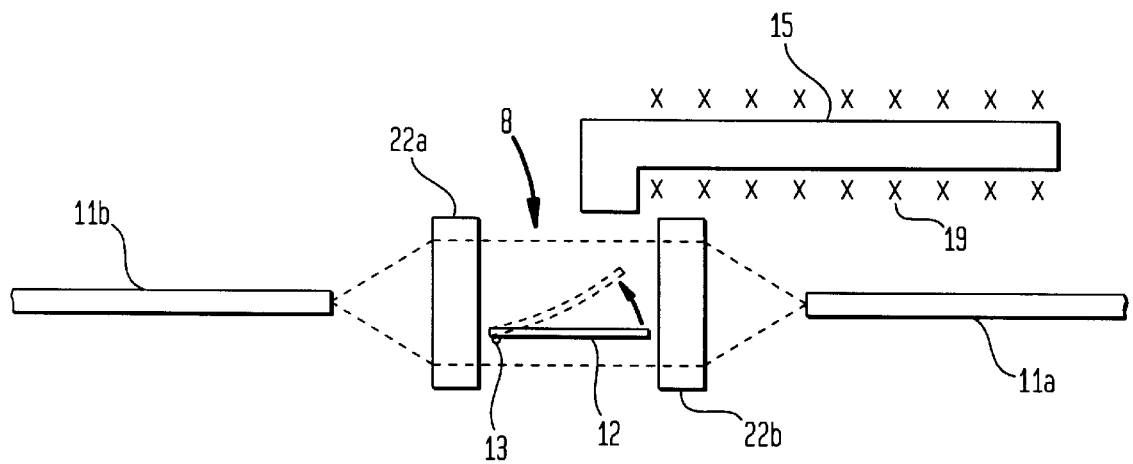
FIGS. 5A–5B schematically illustrate further alternative embodiments of the inventive attenuator using an elastically-bendable magnetic shutter (FIG. 5A), and a spring with a magnetically movable and latchable shutter (FIG. 5B)
Figure 5B:
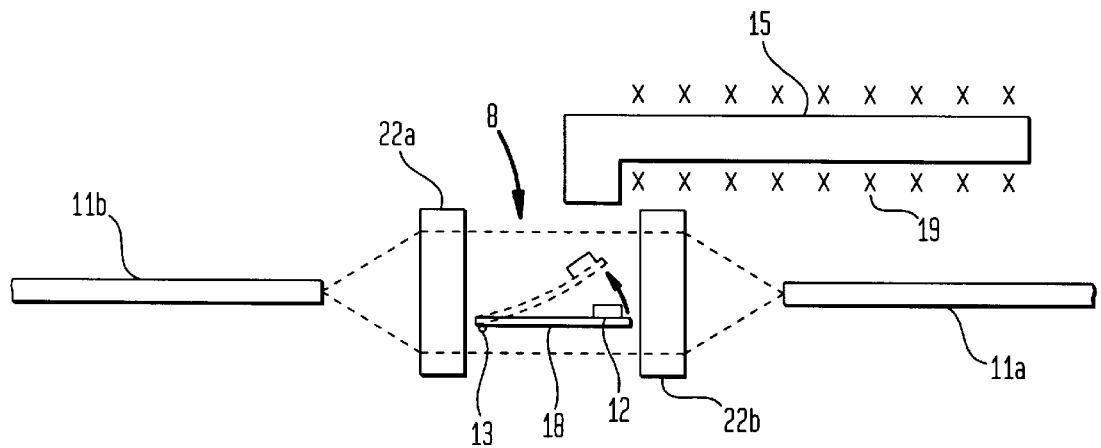

FIGS. 5A–5B schematically illustrate further alternative embodiments of the inventive attenuator using light-broadening components 22a, 22b. In each case, a second magnetic component 15 is placed outside the gap 8, and is controlled by solenoid 19. Two light-broadening components 22a, 22b, such as GRIN lenses, are placed within the gap 8, and the shutter magnet 12 is placed between the components 22a, 22b. In FIG. 5A, an elastically-bendable magnetic shutter is used, such as a shutter made of the Fe—28%Cr—7% alloy mentioned earlier Here, the shutter material itself is utilized as the spring (as in FIG. 1A), with one end of the shutter being bonded at 13 to a fixed point. In FIG. 5B, a thin spring 18 (e.g., made with a springy metal sheet of stainless steel or copper alloys), is used; one end of the thin spring 18 is bonded at 13 to a fixed surface, and a magnetic component 12 is secured to the other end of the spring 18. As the second magnetic component 15 is magnetized with solenoid 19 to a desired level and the field removed, the shutter will be attracted toward (or repelled from, depending on the polarities), the second magnet 15 with a latchable bending displacement A movement stopper (not shown), defining an upper movement limit and lower movement limit may be conveniently incorporated in the device to confined movement of the shutter magnet 12 within a desired operating range, e.g., so that the elastic limit of the bending spring material is not exceeded and the spring component is not deformed. In FIGS. 5A–5B, the shutter magnet can be made of latchable magnetic material, soft magnetic material, or high-coercivity permanent magnetic material, as previously described, which may be used directly as a spring component itself (e.g., as in FIG. 5A), or bonded onto a nonmagnetic spring component (e.g., as in FIG. 5B).

Figure 6:
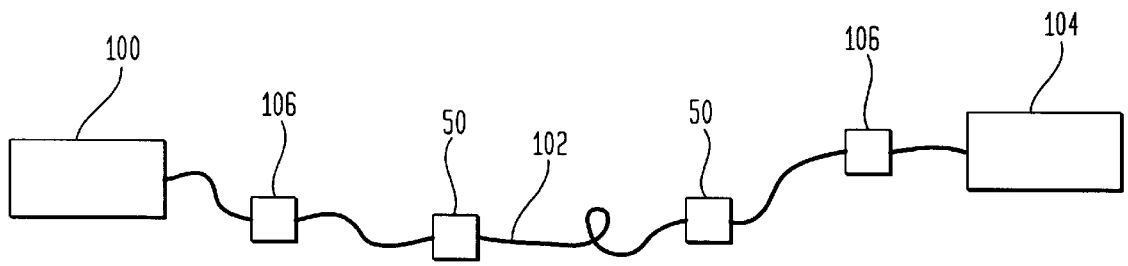
FIG. 6 schematically illustrates an optical communication system comprising the inventive attenuator.

Referring to FIG. 6, it will be appreciated that the inventive attenuator device 50 may comprise one or more parts of an optical fiber communication system that further comprises elements such as a transmitter 100, a receiver 104, and an optical path 102 connecting transmitter and receiver, with one or more amplifiers 106, disposed along the optical path. The attenuator device may be placed at select regions of the optical path, and one or more attenuator devices can be used in the optical system. The optical system may comprise a DWDM system.

It is understood that the embodiments described herein are merely exemplary and that a person skilled in the art may make variations and modifications without departing from the spirit and scope of the invention. All such variations and modifications are intended to be included within the scope of the appended claims.

We claim:

1. A variable attenuator device for attenuating a signal transmitted between two optically aligned components, the two optical components being disposed in spaced-apart relation to define a gap therebetween, the attenuator comprising:
    at least one magnetic shutter movable from a first position within the gap to at least a second position;
    a second magnetic component for latchably coacting with the at least one magnetic shutter to move the shutter from the first position to the at least second position, wherein when the at least one magnetic shutter is in the first position, the shutter causes a first level of attenuation in the signal transmitted between the two optical components and when ire at least one magnetic shutter is in the at least second position, the shutter causes a second level of attenuation in the signal such that movement of the shutter from the first position to the at least second position causes a change in the attenuation to define the variable attenuator device.

2. The attenuator device of claim 1 in which the second magnetic component is stationary.

3. The attenuator device of claim 1 in which the two optical components are selected from optical fibers, lasers, fiber amplifiers, planar waveguides, and photo-diodes.

4. The attenuator device of claim 3 in which the two optical components comprise two terminated optical fibers having aligned end faces.

5. The attenuator device of claim 1 in which the shutter is elastically confined to move within a predetermined range of positions.

6. The attenuator device of claim 5 in which the shutter comprises a springy strip of material bonded at one end to a fixed surface.

7. The attenuator device of claim 1 further comprising a spring coupled at one end to the shutter and at the other end to the second magnetic component to elastically confine the shutter to move within a predetermined range of positions.

8. The attenuator device of claim 1 further comprising a spring and a support frame, in which the spring is coupled at one end to the shutter and at the other end to the support frame to elastically confine the shutter to move within a predetermined range of positions.

9. The attenuator device of claim 1 in which the shutter has a cross-sectional geometry selected from circular, triangular, square, rectangular, or any one of a circular, triangular, square, or rectangular cross-section having one or more holes disposed therein for providing a gradient.

10. The attenuator device of claim 1 in which at least one of the shutter and the second magnetic component is fabricated with a programmable magnetic material to define a latchable variable attenuator.

11. The attenuator device of claim 10 in which the programmable magnetic material has a magnet strength modifiable by a pulse magnetic field.

12. The attenuator device of claim 1, further comprising at least one light-broadening component disposed within the gap for enhancing the optical alignment of the two optical components.

13. A variable attenuator device for attenuating a signal comprising:
    two optical components that are optically aligned for transmitting the signal, the two optical components being disposed in spaced-apart relation to define a gap therebetween;
    at least one magnetic shutter movable from a first position within the gap to at least a second position;
    a second magnetic component for latchably coacting with the at least one magnetic shutter to move the shutter from the first position to the at least second position;
    a means for providing a controllable magnetic field to magnetize at least one of the second magnetic component and the shutter to cause the shutter to move relative to the second magnetic component due to magnetic attraction or repulsion between the shutter and the second magnetic component;
    a spring component for spring-biasing the movement of the shutter within a defined range of positions;
    wherein when the magnetic shutter is in the first position, the shutter causes a first level of attenuation in the signal transmitted between the two optical components, and when the magnetic shutter is in the at least second position, the shutter causes a second level of attenuation in the signal such that application of a magnetic field by the means for providing the magnetic field induces an attractive or repulsive force between the shutter and the second magnetic component, inducing movement of the shutter from the first position to the at least second position, thereby changing the attenuation in the signal to define the variable attenuator device.

14. The attenuator device of claim 13, in which the means for providing the controllable magnetic field comprises at least one solenoid disposed adjacent at least one of the shutter and the second magnetic component.

15. A method for attenuating an optical signal comprising the steps of:
   aligning two optical components in spaced-apart relation to define a gap therebetween wherein the signal may be transmitted through the gap;
   positioning a magnetic shutter at a first position within the gap; and
   moving the magnetic shutter from the first position to at least a second position by applying an external magnetic field;
   wherein when the magnetic shutter is in the first position, the shutter causes a first level of attenuation in the signal transmitted between the two optical components, and when the magnetic shutter is in the at least second position, the shutter causes a second level of attenuation in the signal such that moving the shutter from the first position to the at least second position causes a change in the attenuation of the signal.

16. The method of claim 15, in which the second level of attenuation is latched so that a supply of power is not needed to maintain the second level of attenuation once achieved.

17. The method of claim 15, in which the step of moving the magnetic shutter comprises variably magnetizing the shutter.

18. The method of claim 15, further comprising providing a second magnetic component disposed adjacent the shutter, and in which the step of moving the magnetic shutter comprises magnetizing the second magnetic component.

19. The method of claim 15 in which the step of moving the magnetic shutter comprises a high-speed actuation operation through magnetic pulse in which the speed of the pulse field is in the range of about $10^{-1}$ seconds or faster.

20. An optical communications system comprising
   a variable attenuator device for attenuating a signal transmitted between two optically aligned optical components, the two optical components being disposed in spaced-apart relation to define a gap therebetween, the attenuator comprising:
      at least one magnetic shutter movable from a first position within the gap to at least a second position;
      a second magnetic component for latchably coacting with the at least one magnetic shutter to move the shutter from the first position to the at least second position,
      wherein when the at least one magnetic shutter is in the first position, the shutter causes a first level of attenuation in the signal transmitted between the two optical components and when the at least one magnetic shutter is in the at least second position, the shutter causes a second level of attenuation in the signal such that movement of the shutter from the first position to the at least second position causes a change in the attenuation to define the variable attenuator device.

21. An optical communications system comprising
   a variable attenuator device for attenuating a signal comprising:
      two optical components that are optically aligned for transmitting the signal, the two optical components being disposed in spaced-apart relation to define a gap therebetween;
      at least one magnetic shutter movable from a first position within the gap to at least a second position;
      a second magnetic component for latchably coacting with the at least one magnetic shutter to move the shutter from the first position to the at least second position;
      a means for providing a controllable magnetic field to magnetize at least one of the second magnetic component and the shutter to cause the shutter to move relative to the second magnetic component due to magnetic attraction or repulsion between the shutter and the second magnetic component;
      a spring component for spring-biasing the movement of the shutter within a defined range of positions;
      wherein when the magnetic shutter is in the first position, the shutter causes a first level of attenuation in the signal transmitted between the two optical components, and when the magnetic shutter is in the at least second position, the shutter causes a second level of attenuation in the signal such that application of a magnetic field by the means for providing the magnetic field induces an attractive or repulsive force between the shutter and the second magnetic component, inducing movement of the shutter from the first position to the at least second position, thereby changing the attenuation in the signal to define the variable attenuator device.

* * * * *